United States Patent [19]
Uchida et al.

[11] Patent Number: 4,943,977
[45] Date of Patent: Jul. 24, 1990

[54] CORRELATION PULSE GENERATING CIRCUIT IN A SPREAD SPECTRUM RECEIVER

[75] Inventors: Yoshitaka Uchida; Kouichi Kato, both of Tokyo, Japan

[73] Assignee: Clarion Co., Ltd., Tokyo, Japan

[21] Appl. No.: 376,860

[22] Filed: Jul. 7, 1989

[30] Foreign Application Priority Data

Jul. 12, 1988 [JP] Japan ............................... 63-174224

[51] Int. Cl.⁵ ........................... H01K 1/04; H04L 9/00
[52] U.S. Cl. ......................................................... 375/1
[58] Field of Search ............................................ 375/1

[56] References Cited

U.S. PATENT DOCUMENTS 4,884,284 11/1989 Nakayama ............................ 375/1

Primary Examiner—Salvatore Cangialosi
Attorney, Agent, or Firm—Flynn, Thiel, Boutell & Tanis

[57] ABSTRACT

A spread spectrum receiver is disclosed in which a correlation pulse generating circuit for generating a correlation pulse from a correlation spike outputted by a correlator comprises an A/D converting circuit which A/D-converts said correlation spike; an absolute value detecting circuit for detecting the absolute value of the output of said A/D converting circuit; a peak value detecting circuit for detecting the value corresponding to a peak of the output of said peak value detecting circuit; a threshold value setting circuit for generating a threshold signal based on the output of said peak value detecting circuit; and a comparing circuit for comparing the output of the absolute value detecting circuit with said threshold signal to generate the correlation pulse.

3 Claims, 2 Drawing Sheets

CORRELATION PULSE GENERATING CIRCUIT IN A SPREAD SPECTRUM RECEIVER

FIELD OF THE INVENTION

The present invention relates to a correlation pulse generating circuit used in a spread spectrum receiver.

BACKGROUND OF THE INVENTION

In the spread spectrum communication system, it is necessary to set an appropriate threshold signal, following the correlator output signal level of the receiver, even if it varies, so that it is possible to detect the aimed correlation output signal.

As a prior art method, there is known a method disclosed e.g. in a Japanese patent application entitled "Spread Spectrum Receiver", filed by the assignee of the present application, Jan. 14, 1988 (Application No. 63-7144).

By this method, a positive and a negative polarity correlation spike outputted by a correlator are inputted to respective peak value detecting circuits to obtain peak values corresponding to the positive and the negative polarity correlation spike, which peak values are compared/selected, and a correlation pulse is outputted by obtaining threshold signals on the basis of the selected peak values to compare the threshold signals with the correlation spikes.

However, by this method, since 2 peak value detecting circuits as well as 2 comparing and selecting circuits were required for detecting the peak values of the positive and the negative polarity correlation spike. Therefore this method had a drawback that the spread spectrum communication device is complicated, which increases the number of parts, it is expensive and it consumes much electric power.

OBJECT OF THE INVENTION

The present invention relates to a receiver used in a spread spectrum communication system and in particular to a correlation pulse generating circuit used therein and the object thereof is to provide a correlation pulse generating circuit, which is simple and cheap, and by which even in the case where the correlation output signal level varies, accompanied by variations in the received signal level, it is possible to decode data surely by setting an appropriate threshold signal to obtain the correlation pulse.

SUMMARY OF THE INVENTION

In order to achieve the above object, a correlation pulse generating circuit according to the present invention, used in a spread spectrum receiver for obtaining a correlation pulse from a correlation spike correlating a received signal with a reference signal by means of a correlator, is characterized in that it comprises an A/D converting circuit, which A/D-converts the correlation spike described above, an absolute value detecting circuit for detecting the absolute value of the output of the A/D converting circuit stated above, a peak value detecting circuit for detecting the value corresponding to a peak of the output of the peak value detecting circuit stated above, a threshold value setting circuit for generating a threshold signal based on the output of the peak value detecting circuit stated above, and a comparing circuit for comparing the output of the absolute value detecting circuit with the threshold signal described above to generate the correlation pulse.

A correlation spike is obtained by correlating a received signal with a reference signal by means of a correlator. The value of the correlation spike is A/D-converted and the absolute value thereof is detected. A threshold signal is generated on the basis of the maximum value thereof and compared with the absolute value stated above to output a correlation pulse corresponding to the correlation pulse.

DETAILED DESCRIPTION

Figure 1:
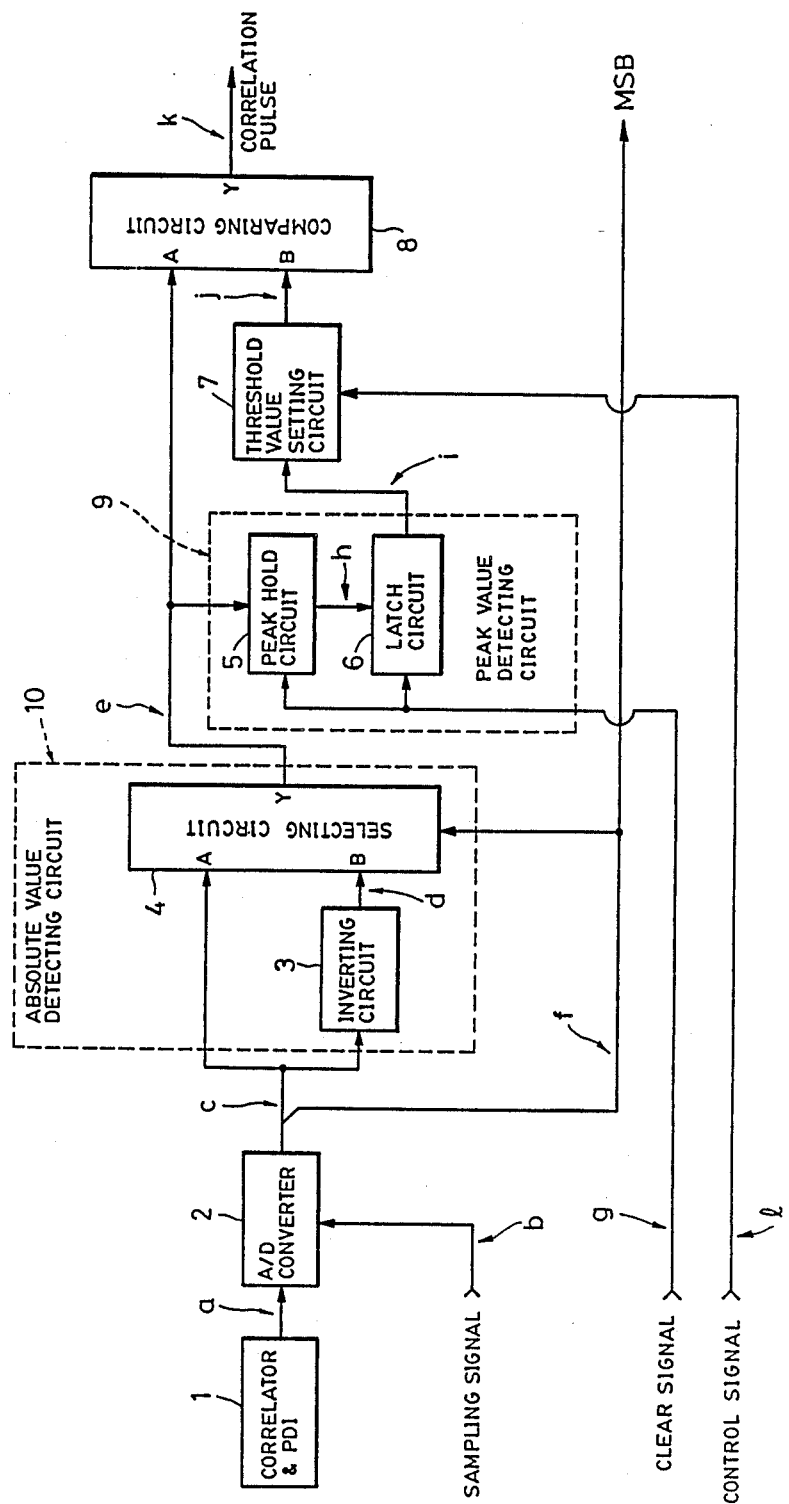
FIG. 1 is a block diagram illustrating the construction of a correlation pulse generating circuit used in the spread spectrum receiver according to this invention.

FIG. 1 is a block diagram illustrating the construction of the correlation pulse generating circuit used in the spread spectrum receiver according to this invention, in which reference numeral 1 is a correlator and PDI (Post Detection Integration: integrating circuit); 2 is an A/D converting circuit; 3 is an inverting circuit; 4 is a selecting circuit; 5 is a peak hold circuit; 6 is a latch circuit; 7 is a threshold value setting circuit; 8 is a comparing circuit; 9 is a peak value detecting circuit consisting of the peak hold circuit 5 and the latch circuit; and 10 is an absolute value detecting circuit 3 consisting of the inverting circuit 3 and the selecting circuit 4.

Hereinbelow the operation of the embodiment described above will be explained.

Figure 2:
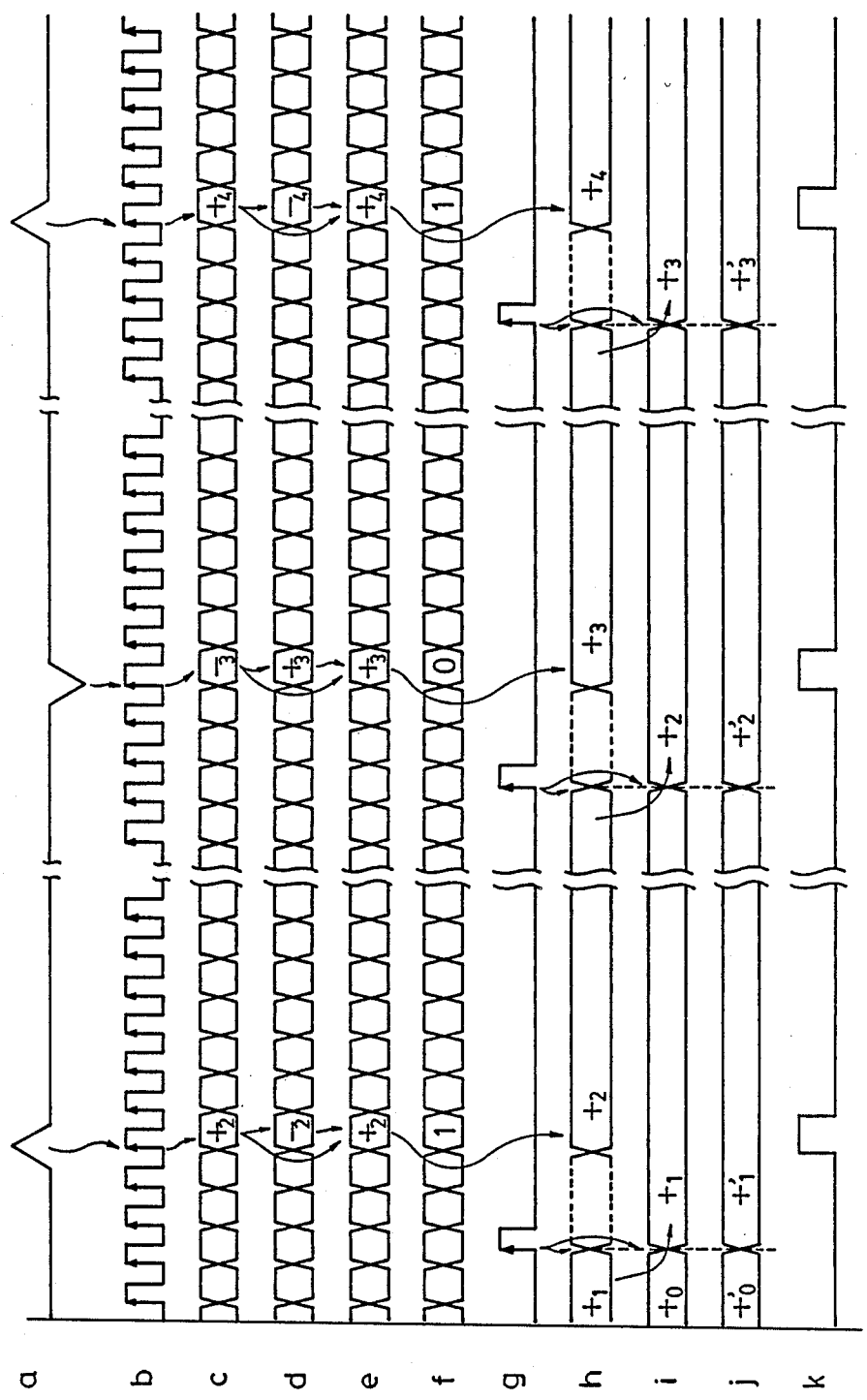
FIG. 2 is a timing chart showing signals in various parts in the circuit indicated in FIG. 1.

FIG. 2 is a timing chart showing signals in various parts in the circuit indicated in FIG. 1.

A correlation spike a coming from the correlator 1 is A/D-converted on the basis of a sampling signal b in the A/D converting circuit 2 to obtain an output c. Here the correlation spike a is A/D-converted by the rising edge of the sampling signal b for every period thereof.

Now, if it is supposed that the output code of the output c of the A/D converting circuit 2 consists of N bits and it is in a linear relation with respect to the input of the A/D converting circuit 2, the output c of the A/D converting circuit 2 is in a region comprised between MSB1, 0, ... 0, LSB0 and MSB1, 1, ... LSB1 (MSB and LSB representing the most significant bit and the least significant bit, respectively) in the case where the correlation spike a has the positive polarity, and between MSB0, 1, ... 1, LSB1 and MSB0, 0, ... 0, LSB0, in the case where it has negative polarity. For noise the output c has values at the neighborhood of MSB1, 0, ... 0, LSB0.

That is, in the case where it has the positive polarity, the most significant bit is always "1" and the remaining bits are in a region from all "0" to all "1" for the maximum value. On the contrary, in the case where it has the negative polarity, the most significant bit is always "0" and the remaining bits are in a region from all "1" to all "0" for the minimum value.

Consequently, if the polarity of the output c of the A/D converting circuit is inversed, the negative polarity is equivalent to the positive polarity (converses being always true). The output c of the A/D converting circuit 2 is directly inputted in the selecting circuit 4 and in addition the output d of the inverting circuit 3, which is a signal obtained by inverting the polarity of the output c of the A/D converting circuit 2 by means of the inverting circuit 3, is also inputted therein. In FIG. 2, values of the output c after the A/D conversion of the correlation spikes a having the positive polarity and the negative polarity correspond to + and −, respectively. Consequently, the output d of the inverting circuit 3 corresponds to a transformation of +→− and −→+.

Utilizing the property that a positive correlation spike and a negative correlation spike occur never simultaneously, using the most significant bit f of the output c of the A/D converting circuit 2 as a trigger, the selecting circuit 4 works so that it makes the output c of the A/D converting circuit 2 pass through, in the case where the most significant bit f is "1" (i.e. the positive correlation spike is dealt with), and the output d of the inverting circuit 3 pass through, in the case where the most significant bit f is "0" (i.e. the negative correlation spike is dealt with).

In a period where neither positive nor negative polarity correlation spike exists, the selecting circuit 4 makes either one pass through, depending on the distribution of noise (state of the most significant bit f). In FIG. 2, the periods where there is no sign (+, −, 1 or 0) are those described above.

As described above, the selecting circuit 4 selects either one of the two inputs, depending on the most significant bit f of the output c of the A/D converting circuit 2, which represents the operation to detect the absolute value of the correlation spike.

Then the maximum value of the output e of the selecting circuits 4 is detected and held by the peak hold circuit 5. In this way, it is possible to obtain the maximum of the absolute value of both the positive and the negative polarity correlation spike, regardless of the polarity, positive or negative.

Furthermore, the maximum value obtained by the peak hold circuit 5 is latched by the latch circuit 6 by using a clear signal g as a trigger and at the same time the content h stored in the peak hold circuit 5 is cleared. At this time, the pulse period of the clear signal g is equal to one period of the correlation spike. That is, the peak hold circuit 5 clears the content h stored therein by the clear signal g for every period of the correlation spike and begins to hold the peak for a new period of the correlation spike.

Therefore, if the peak hold circuit has this circuit construction, it is possible to detect surely the maximum value for every period of the correlation spike. Further the maximum value latched by the latch circuit 6 is similarly renewed for every period of the correlation spike.

By adopting such a construction it is possible to follow the level variations, even if they take place in one period of the output of the correlator and it is possible also to remove erroneous operations, in the case where the polarity of the correlation spike is varied.

Then the output i of the latch circuit 6 is inputted in the threshold value setting circuit 7. The threshold value setting circuit 7 effects operations on a control signal l representing a multiplication coefficient with the data of the output i and generates a threshold value signal j. This threshold value signal j is a digital signal of N bits. Further the threshold value setting circuit 7 can set an arbitrary threshold value signal and the control signal l is generated e.g. by a CPU, etc.

Next the threshold value signal j obtained by the threshold setting circuit 7 is inputted in the comparing circuit 8.

The comparing circuit 8 compares the output e selected by the selecting circuit 4 from the group consisting of the output c of the A/D converting circuit 2 and the output d of the inverting circuit, which is obtained by inverting the polarity of the output c of the A/D converting circuit 2 by means of the inverting circuit 3 with the threshold value signal j of the threshold old value setting circuit 7 and a correlation pulse k is obtained, when an output e, which is greater than the threshold signal j, is inputted.

Complementing the above description, it can be said that when the polarity of a first correlation spike a indicated in FIG. 2 is positive, it is possible to set the threshold value signal j in the following period ($+_2'$) by detecting the maximum value ($+_2$) in a certain period, where the positive polarity correlation spike exists and to obtain the final correlation pulse k for the absolute value ($+_3$) in that period in the comparing circuit 8.

Furthermore, the final correlation pulse k is one obtained, corresponding to the correlation spike a from the correlator 1, and in order to judge what polarity of the correlation spike a this final correlation pulse k corresponds to, it is possible to carry out it easily by examining the most significant bit f in the timing where this correlation pulse k is obtained. (When it is "1", the polarity of the correlation spike is positive and when it is "0", it is negative.)

As explained above, according to this invention, the circuit construction is not complicated, and an advantage can be obtained that it is possible to detect surely a either positive or negative polarity correlation spike corresponding to 2-valued base board information, even in a situation where level variations take place, and to realize a pulse generating circuit, which can be operated without errors.

While particular embodiments of the invention have been shown and described, it will be obvious to those skilled in the art that various changes and modifications may be made without departing from the present invention in its broader aspect.

What is claimed is:

1. A spread spectrum receiver comprising:
   a correlator for generating a correlation spike by correlating a received signal with a reference signal; and
   a correlation pulse generating circuit for generating a correlation pulse, responding to said reference signal, including
   an A/D converting circuit which A/D-converts said correlation spike;
   an absolute value detecting circuit for detecting the absolute value of the output of said A/D converting circuit;
   a peak value detecting circuit for detecting the value corresponding to a peak of the output of said absolute value detecting circuit;
   a threshold value setting circuit for generating a threshold signal based on the output of said peak value detecting circuit; and
   a comparing circuit for comparing the output of the absolute value detecting circuit with said threshold signal to generate the correlation pulse.

2. A spread spectrum receiver according to claim 1 wherein said peak value detecting circuit includes a selecting circuit and an inverting circuit, the output of said A/D converting circuit and an inverted output obtained by inverting the polarity of said output by means of said inverting circuit being inputted in said selecting circuit, said selecting circuit being so constructed that either one of said output and said inverted output is allowed to pass therethrough, depending to the content of the most significant bit of said output and said inverted output.

3. A spread spectrum receiver according to claim 1 wherein said peak value detecting circuit includes a peak hold circuit for holding the peak of the output of said absolute value detecting circuit and a latch circuit for latching the output of said peak hold circuit.

* * * * *